(12) United States Patent     (10) Patent No.: US 9,421,744 B2
Shair et al.     (45) Date of Patent: Aug. 23, 2016

(54) METHODS AND SYSTEMS FOR AUTOMATED PLY LAYUP FOR COMPOSITES

(71) Applicant: GENERAL ELECTRIC COMPANY, Schenectady, NY (US)

(72) Inventors: Sultan Shair, Ismaning b. Bavaria (DE); Julian Thomas O'Flynn, Halifax (CA); Mathias Ernst Messmer, Lenggries b. Bavaria (DE); Frank Worthoff, Cincinnati, OH (US); Mile Ostojic, London (CA); Mark Ernest Vermilyea, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 169 days.

(21) Appl. No.: 14/479,871

(22) Filed: Sep. 8, 2014

(65) Prior Publication Data

US 2014/0374003 A1    Dec. 25, 2014

Related U.S. Application Data

(62) Division of application No. 13/600,780, filed on Aug. 31, 2012, now Pat. No. 8,826,957.

(51) Int. Cl.
*B29C 65/48*      (2006.01)
*B29C 65/52*      (2006.01)
(Continued)

(52) U.S. Cl.
CPC .......... *B32B 37/0007* (2013.01); *B29C 65/78* (2013.01); *B29C 70/38* (2013.01);
(Continued)

(58) Field of Classification Search
USPC .............. 156/73.6, 289, 297, 307.1, 307.3, 156/307.7, 705, 708, 711, 719, 362, 379.8, 156/499, 537, 538, 580, 582, 752, 754, 757, 156/767
See application file for complete search history.

(56) References Cited

U.S. PATENT DOCUMENTS

| | | | |
|---|---|---|---|
| 2,039,832 A * | 5/1936 | Palmer | ..................... G06K 5/00 |
| | | | 209/549 |
| 2,339,179 A | 1/1944 | Loeb | |

(Continued)

FOREIGN PATENT DOCUMENTS

| | | |
|---|---|---|
| DE | 19903516 A1 | 8/2000 |
| EP | 236601 B2 | 9/1996 |

(Continued)

OTHER PUBLICATIONS

Kordi et al, "Development of a Multifunctional Robot End effector system for Automated Manufacture of Textile Preforms", IEEE/ASME international conference on Advanced intelligent mechatronics, pp. 1-6, Sep. 2007.

(Continued)

*Primary Examiner* — Sing P Chan
(74) *Attorney, Agent, or Firm* — John P. Darling

(57) ABSTRACT

A method for applying at least one ply onto a tool or an uncured composite layup disposed on the tool includes automatically controlling slidably removing at least one nonstick separator relative to the at least one ply positioned on the at least one nonstick separator to inhibit at least a portion of the at least one ply from adhering to the tool or uncured composite layup while applying a moving compressive force to an outer surface of the at least one ply relative to a moving trailing edge of the at least one nonstick separator to adhere at least a portion of the at least one ply to the tool or to the uncured composite layup.

20 Claims, 14 Drawing Sheets

US 9,421,744 B2
Page 2

(51) Int. Cl.
    *B32B 37/12*     (2006.01)
    *B32B 37/26*     (2006.01)
    *B32B 38/10*     (2006.01)
    *B32B 43/00*     (2006.01)
    *B32B 37/00*     (2006.01)
    *B29C 70/38*     (2006.01)
    *B29C 65/78*     (2006.01)
    *B32B 37/02*     (2006.01)
    *B32B 37/14*     (2006.01)
    *B32B 38/00*     (2006.01)
    *B29C 33/68*     (2006.01)
    *B29C 65/18*     (2006.01)
    *B29C 65/20*     (2006.01)
    *B29C 65/00*     (2006.01)
    *B32B 38/18*     (2006.01)
    *B65H 41/00*     (2006.01)

(52) U.S. Cl.
    CPC ............. *B32B37/0053* (2013.01); *B32B 37/02* (2013.01); *B32B 37/144* (2013.01); *B32B 37/146* (2013.01); *B32B 37/26* (2013.01); *B32B 38/0036* (2013.01); *B29C 33/68* (2013.01); *B29C 65/18* (2013.01); *B29C 65/20* (2013.01); *B29C 66/004* (2013.01); *B29C 66/80* (2013.01); *B29C 66/83413* (2013.01); *B32B 38/1858* (2013.01); *B32B 2037/262* (2013.01); *B32B 2305/022* (2013.01); *B32B 2305/024* (2013.01); *B32B 2305/77* (2013.01); *B32B 2309/12* (2013.01); *B65H 41/00* (2013.01); *Y10T 156/16* (2015.01); *Y10T 156/17* (2015.01); *Y10T 156/1994* (2015.01)

(56) References Cited

U.S. PATENT DOCUMENTS

| | | | | |
|---|---|---|---|---|
| 2,541,240 | A | 2/1951 | Green, Jr. | |
| 2,759,224 | A | 8/1956 | Simons | |
| 2,815,658 | A | 12/1957 | Press | |
| 3,014,263 | A | 12/1961 | Oace | |
| 3,058,634 | A | 10/1962 | Wieneke | |
| 3,083,653 | A | 4/1963 | McGill | |
| 3,244,093 | A | 4/1966 | Vasilantone | |
| 3,405,934 | A | 10/1968 | Elsas | |
| 3,470,573 | A | 10/1969 | Becka et al. | |
| 3,485,421 | A | 12/1969 | Brown | |
| 3,504,452 | A | 4/1970 | Shea | |
| 3,680,418 | A | 8/1972 | Phillips | |
| 3,704,883 | A * | 12/1972 | Don | B27D 1/00 156/556 |
| 3,775,053 | A | 11/1973 | Wisdom | |
| 3,830,122 | A * | 8/1974 | Pearl | B23D 59/04 83/169 |
| 3,841,187 | A * | 10/1974 | Gerber | B26D 7/025 83/451 |
| 3,857,023 | A | 12/1974 | McCall | |
| 3,875,624 | A | 4/1975 | Frezza | |
| 3,914,834 | A | 10/1975 | Hatay | |
| 3,941,326 | A | 3/1976 | Frezza | |
| 3,944,149 | A | 3/1976 | Frezza | |
| 3,956,055 | A * | 5/1976 | Duft | B29C 53/24 156/200 |
| 4,015,748 | A | 4/1977 | Golden | |
| 4,034,636 | A * | 7/1977 | Pearl | A41H 43/0285 414/222.03 |
| 4,073,246 | A | 2/1978 | Crawford et al. | |
| 4,214,541 | A | 7/1980 | Zeigler, Jr. et al. | |
| 4,221,619 | A * | 9/1980 | Lemons | B63B 3/68 156/306.9 |
| 4,224,883 | A | 9/1980 | Zeigler, Jr. et al. | |
| 4,245,576 | A | 1/1981 | Crawford et al. | |
| 4,287,841 | A | 9/1981 | Rovin | |
| 4,337,112 | A * | 6/1982 | Hollis | B29C 66/435 156/351 |
| 4,432,828 | A | 2/1984 | Siempelkamp et al. | |
| 4,487,730 | A | 12/1984 | Larribe | |
| 4,515,097 | A | 5/1985 | Rovin | |
| 4,581,794 | A | 4/1986 | Oldroyd et al. | |
| 4,622,091 | A * | 11/1986 | Letterman | B29B 15/105 156/286 |
| 4,640,810 | A * | 2/1987 | Laursen | D04H 1/732 264/121 |
| 4,719,397 | A * | 1/1988 | Kneifel, II | G05B 19/371 318/567 |
| 4,799,981 | A * | 1/1989 | Stone | G05B 19/353 156/361 |
| 4,829,918 | A | 5/1989 | Young, Jr. | |
| 4,865,309 | A | 9/1989 | Beasock et al. | |
| 4,989,851 | A | 2/1991 | Maede et al. | |
| 5,002,476 | A * | 3/1991 | Kerr | B29C 35/0888 249/134 |
| 5,024,862 | A * | 6/1991 | Frank | B26D 7/018 118/323 |
| 5,035,199 | A | 7/1991 | Hageman | |
| 5,072,359 | A * | 12/1991 | Kneifel, II | G05B 19/402 156/361 |
| 5,252,160 | A | 10/1993 | Scanlon et al. | |
| 5,255,621 | A | 10/1993 | Schramayr et al. | |
| 5,264,067 | A * | 11/1993 | Kuchta | B23Q 1/01 156/361 |
| 5,268,055 | A * | 12/1993 | Bales | B29C 33/0033 156/245 |
| 5,392,839 | A | 2/1995 | Gilley et al. | |
| 5,424,117 | A | 6/1995 | Heiman et al. | |
| 5,519,965 | A | 5/1996 | Robinson | |
| 5,635,013 | A * | 6/1997 | Boi | B29C 70/086 156/285 |
| 5,637,375 | A * | 6/1997 | Hohman | B29C 70/081 428/113 |
| 5,641,366 | A * | 6/1997 | Hohman | B29C 70/081 156/62.8 |
| 5,763,335 | A * | 6/1998 | Hermann | A43B 17/102 442/370 |
| 5,764,518 | A | 6/1998 | Collins | |
| 5,802,681 | A | 9/1998 | Riley et al. | |
| 5,871,604 | A * | 2/1999 | Hohman | B29C 70/081 156/62.8 |
| 5,906,397 | A * | 5/1999 | MacWilliams | B42F 21/02 281/45 |
| 6,000,801 | A * | 12/1999 | Dillon | G01B 11/24 353/121 |
| 6,007,917 | A * | 12/1999 | Weigel | C08G 59/18 428/408 |
| 6,154,991 | A | 12/2000 | Duncan et al. | |
| 6,495,091 | B1 | 12/2002 | Manson et al. | |
| 6,575,218 | B1 | 6/2003 | Burns et al. | |
| 6,739,025 | B2 | 5/2004 | Hu et al. | |
| 7,029,267 | B2 | 4/2006 | Caron | |
| 7,128,869 | B2 | 10/2006 | Habisreitinger et al. | |
| 7,341,086 | B2 * | 3/2008 | Nelson | B29C 70/386 156/523 |
| 7,392,756 | B2 | 7/2008 | Kovach et al. | |
| 7,404,921 | B2 * | 7/2008 | Duval | B29B 11/16 19/302 |
| 7,455,742 | B2 | 11/2008 | Ledet et al. | |
| 7,464,655 | B2 | 12/2008 | Anthony et al. | |
| 7,469,735 | B2 * | 12/2008 | Brown | B29C 70/38 156/392 |
| 7,549,455 | B2 | 6/2009 | Harper et al. | |
| 7,597,760 | B2 | 10/2009 | Lammers et al. | |
| 7,601,237 | B2 | 10/2009 | Burgess et al. | |
| 7,611,601 | B2 | 11/2009 | Nelson et al. | |
| 7,794,640 | B2 * | 9/2010 | Healey | B29C 70/226 112/475.01 |
| 7,824,512 | B2 | 11/2010 | Lauder et al. | |
| 7,867,352 | B2 * | 1/2011 | Johnson | B29C 70/32 156/193 |
| 7,943,076 | B1 * | 5/2011 | Hawkins | B29C 70/30 156/196 |
| 7,978,328 | B2 * | 7/2011 | Engelbart | B29C 70/32 356/237.1 |

(56) References Cited

U.S. PATENT DOCUMENTS

| | | | | |
|---|---|---|---|---|
| 7,993,480 B2* | 8/2011 | Anderson | B29C 70/38 | 156/185 |
| 8,206,540 B2* | 6/2012 | Evans | B32B 27/36 | 156/247 |
| 8,293,051 B2* | 10/2012 | Morris | B29C 33/485 | 156/156 |
| 8,316,687 B2* | 11/2012 | Slattery | B21D 31/005 | 72/476 |
| 8,342,017 B1* | 1/2013 | Bossi | G01N 19/04 | 73/150 A |
| 8,349,105 B2* | 1/2013 | Kehrl | B29C 70/207 | 156/285 |
| 8,491,743 B2* | 7/2013 | Pham | B29C 70/44 | 156/229 |
| 8,511,359 B2* | 8/2013 | Perlman | B29C 33/485 | 156/169 |
| 8,551,380 B2* | 10/2013 | Hawkins | B29C 70/30 | 264/257 |
| 2002/0145217 A1 | 10/2002 | Boyd et al. | | |
| 2003/0213546 A1 | 11/2003 | Hartgrove | | |
| 2005/0136772 A1* | 6/2005 | Chen | A47L 13/16 | 442/381 |
| 2005/0238892 A1* | 10/2005 | Evans | B23B 27/36 | 428/458 |
| 2006/0046042 A1* | 3/2006 | Drzal | B29C 70/504 | 428/292.1 |
| 2006/0090856 A1* | 5/2006 | Nelson | B29C 70/386 | 156/510 |
| 2006/0249868 A1* | 11/2006 | Brown | B29C 70/342 | 264/163 |
| 2007/0017628 A1* | 1/2007 | Evans | B32B 27/36 | 156/230 |
| 2007/0029038 A1* | 2/2007 | Brown | B29C 70/38 | 156/297 |
| 2007/0187024 A1* | 8/2007 | Johnson | B29C 70/32 | 156/250 |
| 2008/0102250 A1 | 5/2008 | Ostendorf et al. | | |
| 2008/0110548 A1* | 5/2008 | Nelson | B29C 70/386 | 156/64 |
| 2008/0169579 A1 | 7/2008 | Mueller-Hummel et al. | | |
| 2008/0245929 A1* | 10/2008 | Patel | B29C 33/10 | 244/131 |
| 2008/0257443 A1 | 10/2008 | Khokar | | |
| 2009/0007981 A1 | 1/2009 | Khokar | | |
| 2009/0130450 A1* | 5/2009 | Anderson | B29C 70/38 | 428/411.1 |
| 2010/0007065 A1 | 1/2010 | Reinhold et al. | | |
| 2010/0011580 A1* | 1/2010 | Brennan | B29C 70/30 | 29/897.2 |
| 2010/0012260 A1* | 1/2010 | Brennan | B29C 70/30 | 156/196 |
| 2010/0078845 A1 | 4/2010 | Guzman et al. | | |
| 2010/0279913 A1* | 11/2010 | Larrson | C11D 17/045 | 510/224 |
| 2011/0000608 A1 | 1/2011 | Bech | | |
| 2011/0036139 A1* | 2/2011 | Slattery | B21D 31/005 | 72/343 |
| 2011/0143140 A1* | 6/2011 | Pham | B29C 70/44 | 428/411.1 |
| 2011/0192541 A1* | 8/2011 | Anderson | B29C 70/38 | 156/349 |
| 2011/0259515 A1* | 10/2011 | Rotter | B29C 70/382 | 156/285 |
| 2012/0073732 A1* | 3/2012 | Perlman | B29C 33/485 | 156/196 |
| 2012/0121866 A1* | 5/2012 | Hawkins | B29C 70/30 | 428/174 |
| 2012/0137776 A1* | 6/2012 | Ogihara | G03B 17/00 | 73/514.01 |
| 2012/0237776 A1* | 9/2012 | Evans | B32B 27/36 | 428/418 |
| 2012/0298309 A1 | 11/2012 | Arakawa et al. | | |
| 2012/0325398 A1* | 12/2012 | Silcock | B29C 70/386 | 156/176 |
| 2012/0330453 A1 | 12/2012 | Samak Sangari et al. | | |
| 2013/0032287 A1* | 2/2013 | Hagman | B29C 70/388 | 156/267 |
| 2013/0036922 A1* | 2/2013 | Stewart | B29C 70/38 | 100/35 |
| 2013/0149934 A1* | 6/2013 | Sang | B32B 5/022 | 442/399 |
| 2013/0228275 A1* | 9/2013 | Watson | B29C 73/12 | 156/285 |
| 2013/0299072 A1* | 11/2013 | Hattori | B29C 70/44 | 156/242 |
| 2013/0307174 A1* | 11/2013 | Lindgren | B23Q 17/20 | 264/40.1 |

FOREIGN PATENT DOCUMENTS

| | | |
|---|---|---|
| GB | 538456 A | 8/1941 |
| GB | 866906 A | 5/1961 |
| GB | 986686 A | 3/1965 |
| GB | 1105968 A | 3/1968 |
| GB | 1172234 A | 11/1969 |
| GB | 1336700 A | 11/1973 |
| GB | 1368330 A | 9/1974 |
| GB | 2399352 A | 9/2004 |
| JP | 5839845 U1 | 3/1983 |
| JP | 06114964 A | 4/1994 |
| JP | 06114995 A | 4/1994 |
| JP | 2011177927 A | 9/2011 |
| WO | 9525424 A1 | 9/1995 |
| WO | 9932699 A1 | 7/1999 |
| WO | 2009158150 A1 | 12/2009 |
| WO | 2011033240 A1 | 3/2011 |

OTHER PUBLICATIONS

Potluri et al, "Robotic Approach to Textile Preforming for Composites", Indian Journal of Fibre & Textile Research, vol. 33, pp. 333-338, Sep. 2008.

Larberg, "Deformability of Unidirectional Prepreg Materials", KTH Engineering Sciences, Stockholm, Sweden, 2009, 27 pages.

International Search Report and Written Opinion issued in connection with corresponding PCT Application No. PCT/US2013/052450 dated Nov. 8, 2013.

Unofficial English Translation of Japanese Office Action issued in connection with corresponding JP Application No. 2015-529821 on Feb. 16, 2016.

* cited by examiner

METHODS AND SYSTEMS FOR AUTOMATED PLY LAYUP FOR COMPOSITES

CROSS REFERENCE TO RELATED APPLICATION

This application is a divisional of U.S. application Ser. No. 13/600,780, now allowed.

BACKGROUND

The present disclosure relates generally to composite structures, and more particularly to methods and systems for laying up a plurality of plies used in forming composite structures.

Conventionally, automated tape laying machines have been employed in the layup of a plurality of plies onto a tool surface for forming composite parts having a generally flat or contoured configuration. Flat or generally contoured surfaces can be layed up by hand using plies cut from broadgood materials, or layed up by automated tape placement or automated fiber placement. These plies can be fully or partially pre-impregnated with resin.

The tape material such as a prepreg material (resin pre-impregnated fiber) is typically disposed on a backing paper, and wound onto a spool. A delivery head of the laying machine retrieves the tape material from the spool, peels away the backing paper which is wound onto a take up roller, and deposits the tape material onto the tool surface or prior deposited layer.

There is a need for further methods and systems for ply layup for composites.

SUMMARY

One aspect of the present disclosure is directed to a method for applying at least one ply onto a tool or onto an uncured composite layup disposed on the tool. The method includes automatically controlling slidably removing at least one nonstick separator relative to the at least one ply positioned on the at least one nonstick separator to inhibit at least a portion of the at least one ply from adhering to the tool or to the uncured composite layup while applying a moving compressive force to an outer surface of the at least one ply relative to a moving trailing edge of the at least one nonstick separator to adhere at least a portion of the at least one ply to the tool or to the uncured composite layup.

Another aspect of the present disclosure is directed to a system for applying at least one ply onto a tool or onto an uncured composite layup disposed on a tool. The system includes an assembly for positioning and removing at least one nonstick separator relative to the tool or the uncured composite layup, and an assembly for applying a moving compressive force. A controller is operable for automatically controlling said assembly for slidably removing the at least one nonstick separator relative to the at least one ply positioned on the at least one nonstick separator to inhibit at least a portion of the at least one ply from adhering to the tool or to the uncured composite layup while controlling said assembly for applying the moving compressive force to an outer surface of the at least one ply relative to a moving trailing edge of the at least one nonstick separator to adhere at least a portion of the at least one ply to the tool or to the uncured composite layup.

BRIEF DESCRIPTION OF THE FIGURES

The subject matter which is regarded as the invention is particularly pointed out and distinctly claimed in the concluding portion of the specification. The system and methods, however, may best be understood by reference to the following detailed description of various embodiments and the accompanying drawings in which:

DETAILED DESCRIPTION

The present disclosure is generally directed to methods and systems for lay up of a plurality of plies such as composite plies, adhesive plies, other materials, or a stack of such plies onto a tool having a flat, contoured or other geometric molding surface, which layup is then operably cured to form a composite part. The composite plies may include prepregs with any fiber and any resin, or dry fabric with any fiber either tackified or not. Other materials for the plies may include cores such as foam, wood, honeycomb, bagging materials, peel plies, release films, bleeders, breathers, bagging film, and other suitable materials. The plies of the stack may be initially draped, compacted, or adhered together on a separate pre-layup tool that may allow for the material to be more easily draped onto a final tool without prior formation of wrinkles. As described in greater detail below, the methods and systems may employ one or more reusable nonstick separators such as nonstick sheets which are removably repositionable between the tool or the prior applied ply or plies, and the next ply or plies to be applied to form the layup. The one or more reusable nonstick separators inhibit the next ply from sticking or adhering to the tool or to the prior applied ply. As the nonstick separator is removed, a moving compressive force, such as caused by one or more compaction rollers, is applied to the positioned ply adjacent to the trailing edge of the nonstick separator to drape or adhere at least a portion of the positioned ply to the tool or to the prior applied ply. The one or more reusable nonstick separators inhibit the ply ahead of the roller from sticking to the tool or to the prior applied ply thereby inhibiting the likelihood of, if not avoiding and preventing, forming wrinkles such as small furrows, ridges, or creases on the adhered at least one ply and resulting in the adhered ply having a smooth outer surface. The present technique allows forming complex shapes such as shapes having curved surfaces, flanges, etc. in which the plies may be processed by initially adhering a middle, center portion, or other portion of the next ply to be applied and working outwardly or in other directions to inhibit forming wrinkles.

Figure 1:
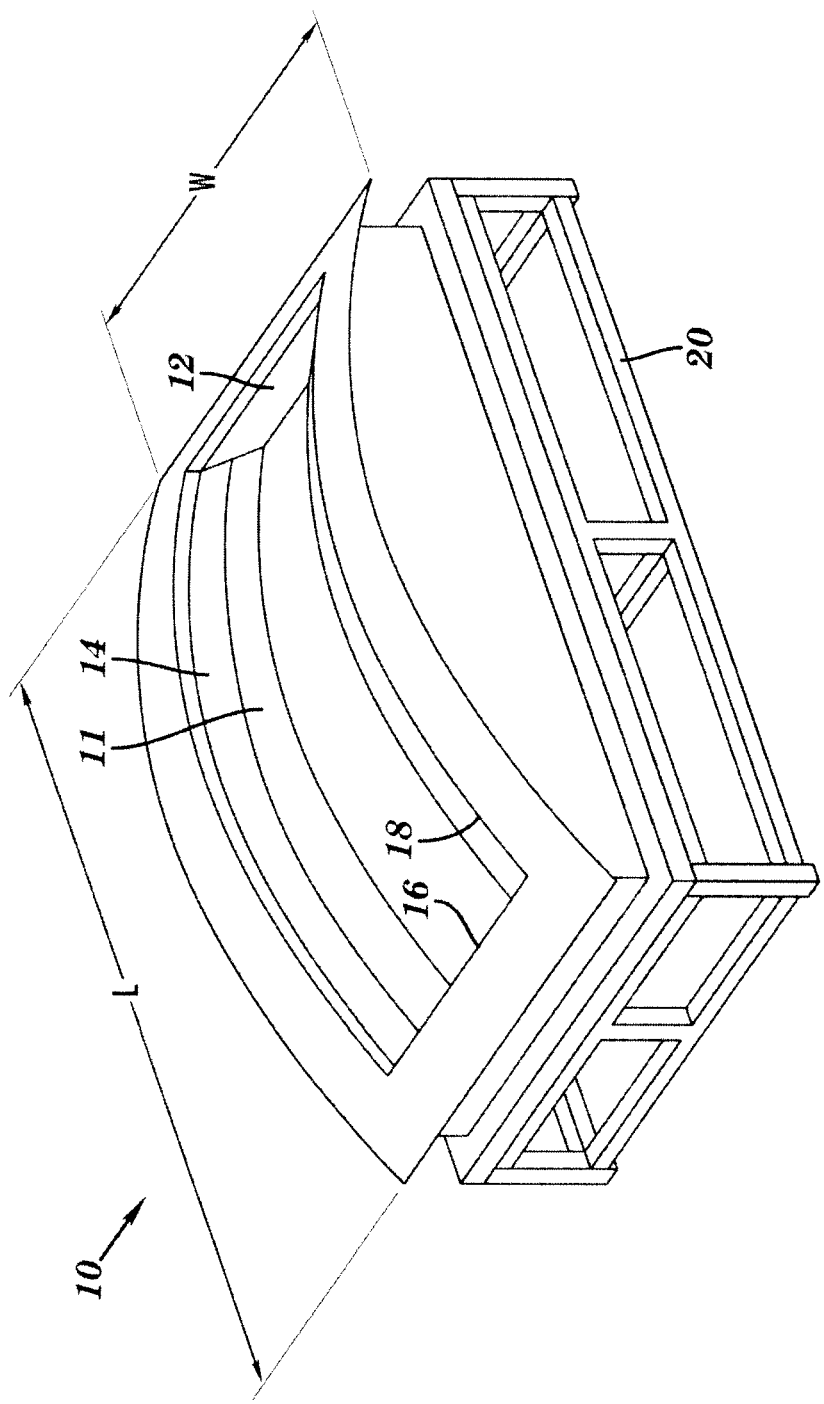
FIG. 1 is a perspective view of a tool for forming a composite part having a complex profile.

FIG. 1 illustrates one embodiment of a tool 10 for use in forming a composite part (not shown in FIG. 1). Tool 10 may be operably supported on a base 20. In this illustrated embodiment, tool 10 may include a curved molding surface 11 which is surrounded about the periphery by a flange or wall such as a plurality of walls 12, 14, 16, and 18. In this embodiment, the walls 12, 14, 16, and 18 extend approximately orthogonal from molding surface 11. Tool 10 may include a length L and a width W. The molding surface may be a complex convex molding surface as shown, or any other geometric surface.

Figure 2:
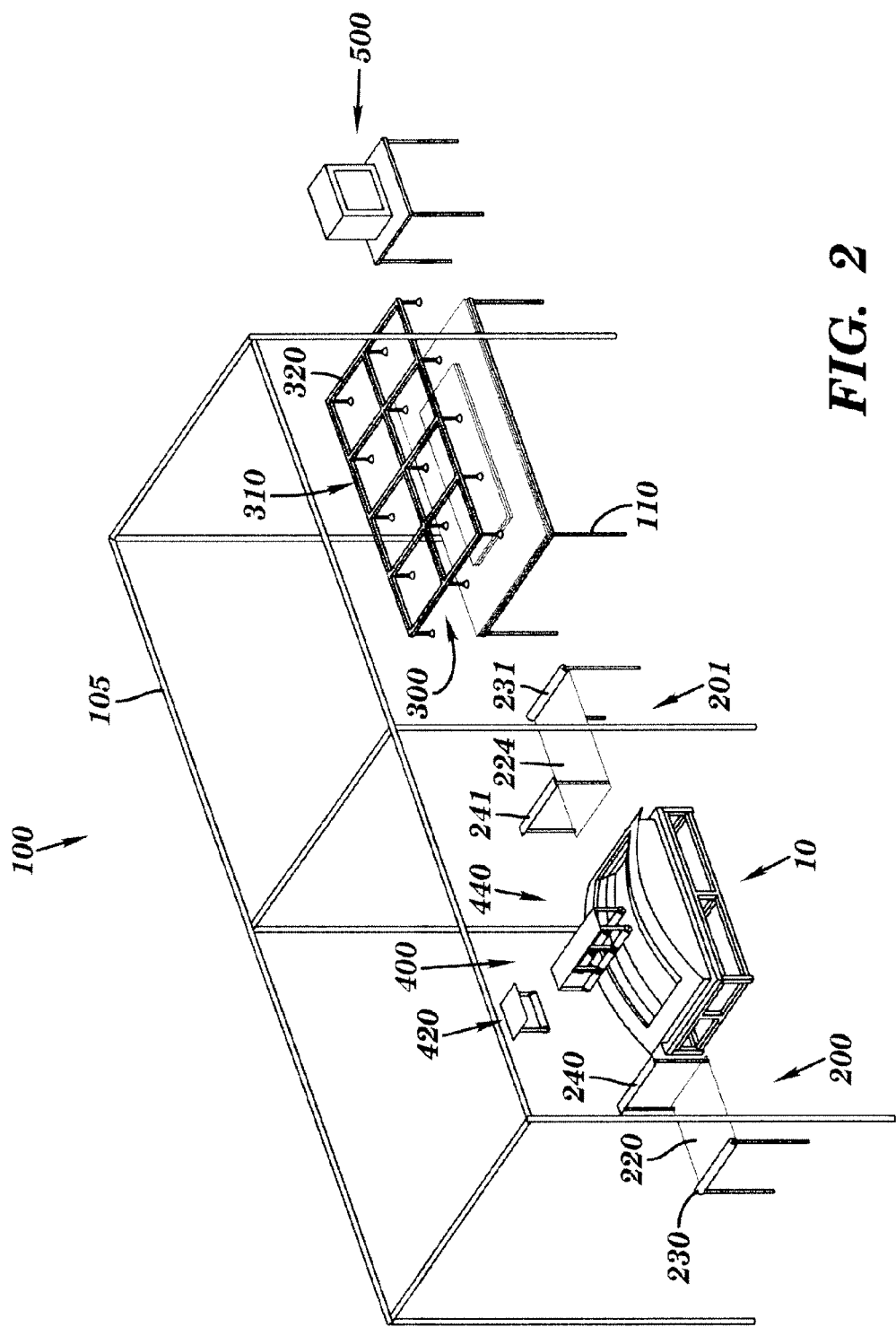
FIG. 2 is a perspective view of a layup system for laying up a plurality of plies onto the tool of FIG. 1 in accordance with aspects of the present system.

FIG. 2 is a diagrammatic illustration of one embodiment of a layup system 100 in accordance with aspects of the present disclosure for lay up of a plurality plies or a stack of plies such as on to tool 10. Tool 10 may be manually or automatically placed in the layup system 100 and placed in a desired location. The tool or the tool base may be operably provided with indicia, tooling pins, or other suitable means for use in determining and/or aligning the tool relative to the layup system. In one embodiment, layup system 100 includes a frame 105 which operably supports assembly 200 and 201 for positioning nonstick separators 220 and 224 onto the molding surface of tool 10 and for removing the one or more nonstick separators 220 and 224 from the molding surface of the tool. Assembly 300 is operable for moving one or more plies or stack of plies from a pre-layup surface such as a flat table 110 onto the nonstick separator disposed on the molding surface of the tool. Assembly 400 is operable for applying a moving compressive force to the one or more portions of the one or more plies or stack of plies to adhere without wrinkles the one or more plies or stack of plies to the tool or prior deposited ply. A controller 500 such as a computing unit or computer is operable for controlling assemblies 200, 201, 300, and 400.

In one embodiment, assembly 200 may include a take-up roller 230 and a movable end effector 240. For example, take-up roller 230 may be disposed along the width of the layup system and rotatably disposed at a first longitudinal end of the tool. Nonstick separator 220 may be disposed on take up roller 230. Movable end effector 240 may be operably attached to an actuator or robotic arm for operably unfurling the nonstick separator and placing the nonstick separator on the molding surface or on an uncured composite layup on the tool. For example, the movable end effector may detach from the nonstick separator after unfurling the nonstick separator. An actuator may be operably connected to the take up roller for winding the nonstick separator onto the take-up roll. A similar assembly 201 may include a take-up roller 231 and a movable end effector 241, and may be provided at the opposite longitudinal end of the tool or elsewhere around the tool as required. In another embodiment, rails may be provided for guiding and positioning the nonstick separators.

Figure 3:
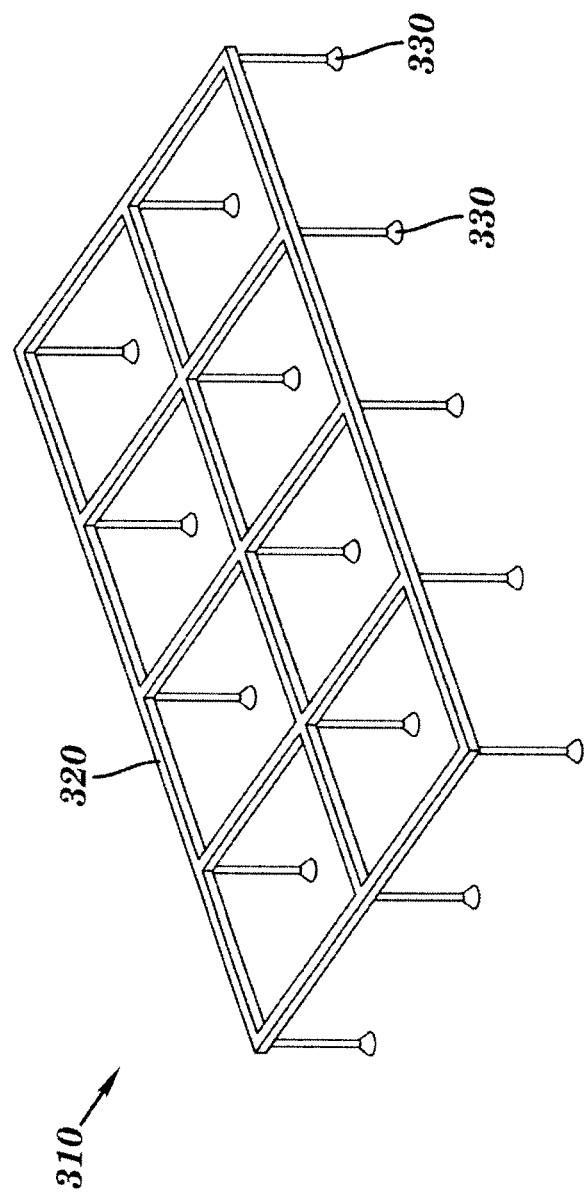
FIG. 3 is a top perspective view of a first embodiment of an end effector for use in moving a ply from a layup table onto a tool.

FIG. 3 illustrates an end effector 310 of assembly 300 (FIG. 2) for moving a ply or a stack of plies from the pre-layup table onto the nonstick separator disposed on the molding surface of the tool or onto the uncured composite layup. For example, end effector 310 may include a movable frame 320 having a plurality of suction cups 330 for releasably attaching to a ply or stack of plies disposed on the pre-layup table and allowing the ply or the stack of plies to be moved upwardly off of the pre-layup table, translated over to the tool, and then lowered onto the nonstick separator or separators disposed on the tool or on the uncured composite layup. The suction cups may be operably attached to a vacuum source and controlled by controller 500 (FIG. 2). With reference to FIG. 2, assembly 300 may include suitable guides for guiding movement of movable frame 320 relative to frame 105. Depending on the size of the ply to be stacked onto the tool, one or more suction cups may be controllably operated to apply a vacuum to the desired suction cups. It will be appreciated that other end effectors such as grippers or clamps may be suitably employed for retrieving and placing the ply onto the tool. In addition, end effector 310 may include one or more downwardly depending members which engage the ply when the ply is lowered onto the tool. The one or more members may be operable to locally force or compress portions of the ply, for example, in the center to adhere the ply relative to the tool or prior applied plies.

Figure 4:
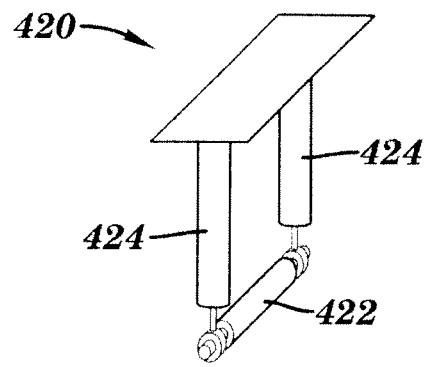
FIG. 4 is a perspective view of a first embodiment of an end effector for applying a moving compressive force for adhering a portion of the ply onto the molding surface of the tool of FIG. 1.

FIG. 4 illustrates a first embodiment of an end effector 420 of assembly 400 (FIG. 2) which includes a roller 422 operable for applying a moving compressive force to the one or more portions of the one or more plies or stack of plies to adhere without wrinkles the one or more plurality of plies or stack of plies to the tool or to the prior deposited ply. Roller 422 may be operably connected to a pair of actuators 424 for example pneumatic actuators, that may be operably connected to pressurized air and controlled by controller 500 (FIG. 2). Other actuators may include hydraulic actuators, springs, linear motors, or other suitable devices.

Figure 5:
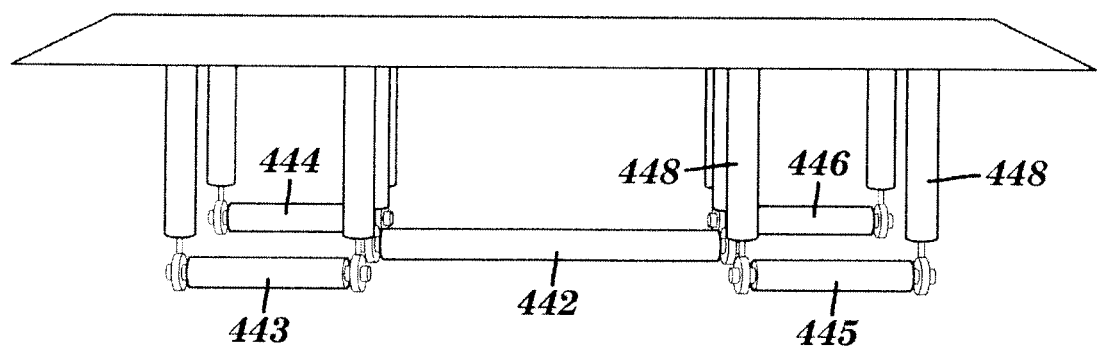
FIG. 5 is a perspective view of a second embodiment of an end effector for applying a moving compressive force for adhering a portion of the ply onto the molding surface of the tool of FIG. 1.

FIG. 5 illustrates a second embodiment of an end effector 440 for applying a moving compressive force to the one or more portions of the one or more plies or stack of plies to adhere without wrinkles the one or more plurality of plies or stack of plies to the tool or to the prior deposited ply. For example, end effector 440 may include a plurality of rollers such as a center roller 442, and side rollers 443, 444, 445, and 446 for applying pressure to adhere, drape, tack, or compact the remaining portions of the ply along the length of the tool. Each of the rollers may be operably connected to actuators 448, for example pneumatic actuators, that may be operably connected to pressurized air and controlled by controller 500 (FIG. 2). Other actuators may include hydraulic actuators, springs, linear motors, or other suitable devices.

With reference again to FIG. 2, controller 500 may be operably connected to the actuators for controlling the take-up rollers for taking up the nonstick separator, and desirably synchronized with end effector 440 of assembly 400 as a ply is being draped or adhered to the tool or an uncured composite layup disposed on the tool. The apparatus for applying a moving compressive force to the ply may be linked to the apparatus for moving the nonstick separator. When the assembly for applying the moving compressive force is returned to the center of the tool, the nonstick separators may be returned to the top of the uncured composite layup. In a further embodiment, the tool itself may include suitable guides such as spaced apart circular rails or a channel for receiving and guiding edges of the nonstick separator, which guides may be removable so as to not remain attached to the tool when the tool and uncured composite layup is placed in an autoclave for curing the composite part.

Figure 6:
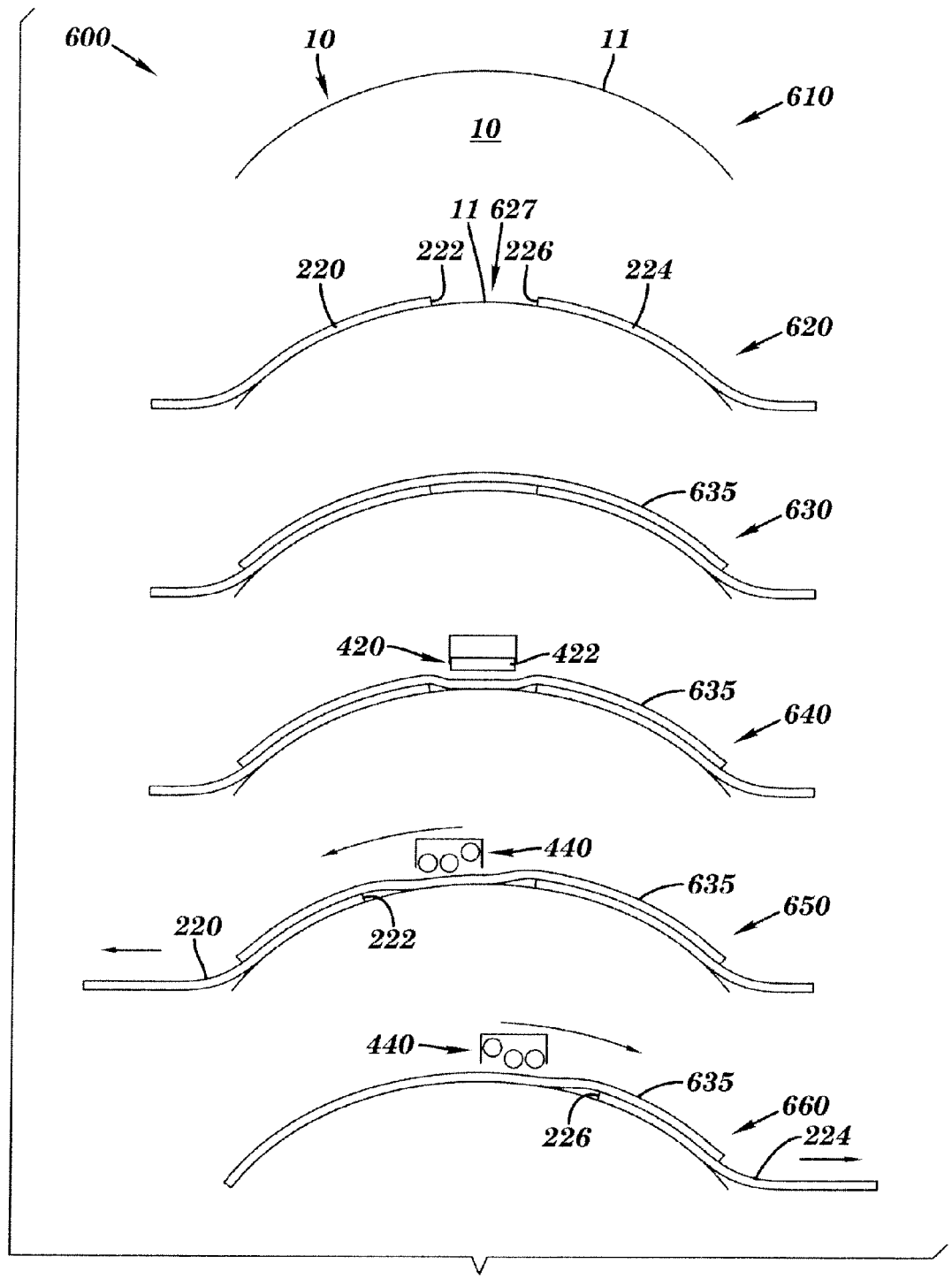
FIG. 6 is a diagrammatic illustration of a process using the layup system of FIG. 2 in accordance with aspects of the present technique for laying up one or more plies onto a molding surface of the tool of FIG. 1.

FIG. 6 is a diagrammatic illustration of a process 600 in accordance with aspects of the present disclosure for use in automating one or more portions of the layup of a ply or a stack of plies, onto, for example, molding surface 11 of tool 10. In FIG. 6, the illustration of the tool is a partial cross-sectional view taken along the length of the tool, e.g., through a center portion of the length of the tool.

Figure 8:
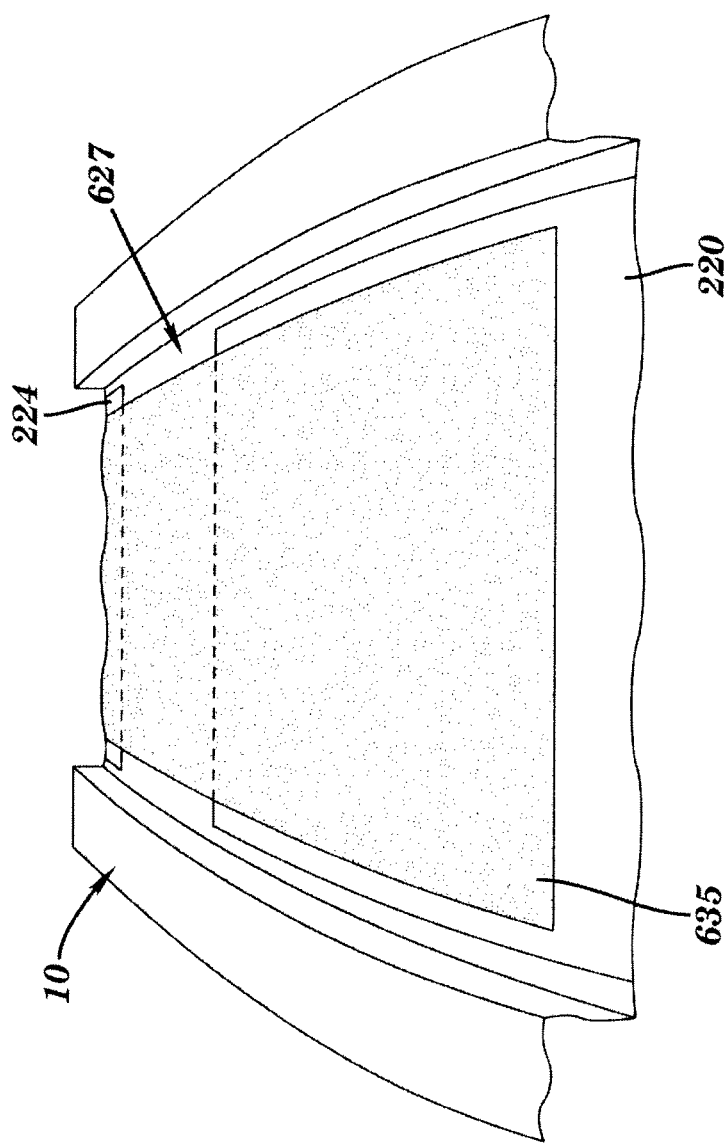
FIG. 8 is a perspective view of the tool of FIG. 1 having nonstick separators disposed thereon and a ply disposed on top of the nonstick separators.

At 610, tool 10 having a convex molding surface 11 may be operably located in layup system 100 (FIG. 2). As noted above, the molding surface may have any geometry such as flat, concave, etc. At 620, first and second nonstick separators 220 and 224 are placed onto molding surface 11 with edges 222 and 226 of the nonstick separators 220 and 224, respectively, defining a gap 627 disposed therebetween. For example, with reference to FIG. 2, end effector 240 of assembly 200 may be moved along rails or attached to a robotic arm operable to unfurl the nonstick separators. FIG. 8 further illustrates first and second nonstick separators 220 and 224 placed on tool 10 with a gap 627 disposed therebetween. While two nonstick separators having a gap disposed therebetween is illustrated, it will be appreciated that one or more nonstick separators without a gap disposed therebetween may be employed depending on the geometry of the part to be formed.

With reference again to FIG. 6, at 630, a ply 635 or a stack of plies is positioned using assembly 300 (FIG. 2) onto the tool on top of the nonstick separators, such as shown in FIG. 8. For example, with reference to FIG. 2, end effector 310 of assembly 300 may be moved along rails or attached to a robotic arm operable to lift a ply or a stack of plies from pre-layup table 110, and move and place it onto the tool on top of the nonstick separators. Desirably, assembly 300 allows the center of the ply to be accurately positioned relative to tool 10. In forming the stack of plies, e.g., on pre-layup table 110, each ply need not be the same size or shape, e.g., some of the plies may be smaller and form only a portion of the part. Plies of different materials could be used at any point in the layup with different tackiness, flexibility, etc.

Figure 9:
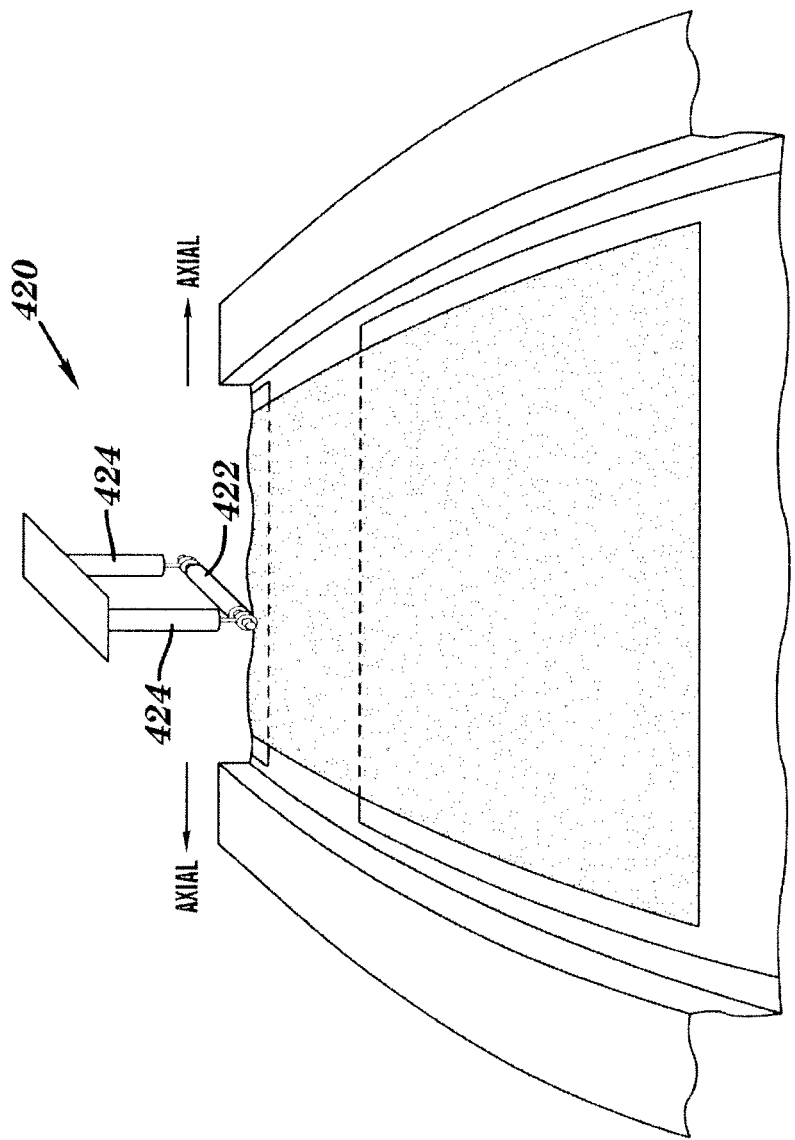
FIG. 9 is a perspective view of the end effector of FIG. 4 for applying a moving compressive force for adhering a portion of the ply onto the molding surface of the tool of FIG. 1.

With reference again to FIG. 6, at 640, a compressive force is movably applied to drape, tack, secure, or adhere the center portion of ply 635 disposed in gap 627 along the width of tool 10 to prevent the ply or stack of plies from shifting during the application of the moving compressive force. For example, as shown in FIG. 9, roller 422 may be used to apply pressure from the center of the ply axially outward in a first direction, e.g., arrow to the right, to the edge of the tool to adhere the ply without wrinkles in the first half of the center portion of the adhered ply. The process can be repeated with roller 422 applying pressure from the center of the ply axially outward in a second direction, e.g., arrow to the left, to the other edge of the tool to adhere the ply without wrinkles in the second half of the center portion of the adhered ply. It will be appreciated that two rollers or sets of rollers moving in opposite directions outwardly from the center may be employed to adhere the ply to the center of the molding surface of the tool. This step secures or fixes without wrinkles the portion of the ply along the center of the tool. In addition, adhering the center portion or other starting portion of the ply such as an end or edge of the ply maintains the ply relative to the mold during subsequent operations to adhere remaining portions of the ply.

Figure 10:
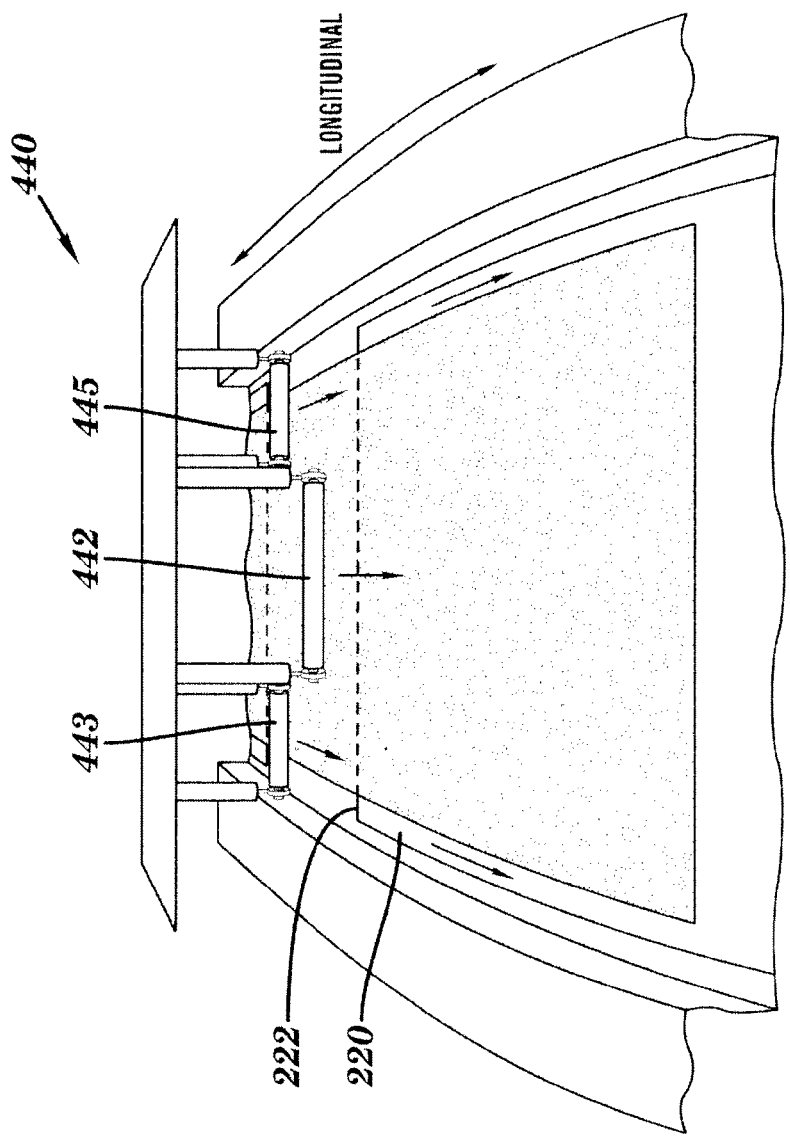
FIG. 10 is a perspective view of three of the compaction rollers of the end effector of FIG. 5 applying a moving compressive force for adhering the ply while simultaneously removing the nonstick separator.

As shown in FIGS. 6 and 10, at 650 (FIG. 6), a movable compressive force is applied, for example, using end effector 440 to drape and adhere the ply without wrinkles outward from the center of the tool in a first direction along the longitudinal length of the tool, and at the same time, the nonstick separator 220 is removed longitudinally away from the center of the tool, edge 222 being a moving trailing edge, while the ply is draped, tacked, secured, or adhered without wrinkles onto the tool along a first portion of the longitudinal length of the tool. Nonstick separator 220 inhibits the ply from sticking to the tool prior to the ply being draped and tacked onto the tool. As best shown in FIG. 10, center roller 442 and side rollers 443, and 445 (rollers 444 and 446 as shown in FIG. 5 being retracted) may apply pressure from the center of the ply longitudinally outward in a first direction, e.g., in the directions of the arrows in FIG. 10, adjacent to and following a trailing edge 222 of nonstick separator 220 to the edge of the tool to inhibit the likelihood of forming wrinkles on a first longitudinal half of the draped or adhered ply.

With reference again to FIG. 6, at 660, a movable compressive force is applied, for example, with one or more rollers, to drape and adhere ply 635 without wrinkles outward from the center of the tool in a second direction along the length of the tool, and at the same time, nonstick separator 224 is removed longitudinally away from the center of the tool, edge 226 being a moving trailing edge, while the ply is draped, tacked, secured, or adhered without wrinkles onto the tool along a second portion of the longitudinal length of the tool to form an uncured composite layup. With reference again to FIG. 10, the process can be repeated with center roller 442 and side rollers 444 and 446 (FIGS. 4 and 5) applying pressure from the center of the ply longitudinally outward in a second direction to the other edge of the tool to inhibit the formation of wrinkles on a second half of the adhered ply. It will be appreciated that two sets of roller moving in opposite directions may be employed at the same time to adhere the ply to the tool. In addition, a plurality of rollers may be disposed and staggered for applying a moving compressive force along the width of the ply.

Figure 7:
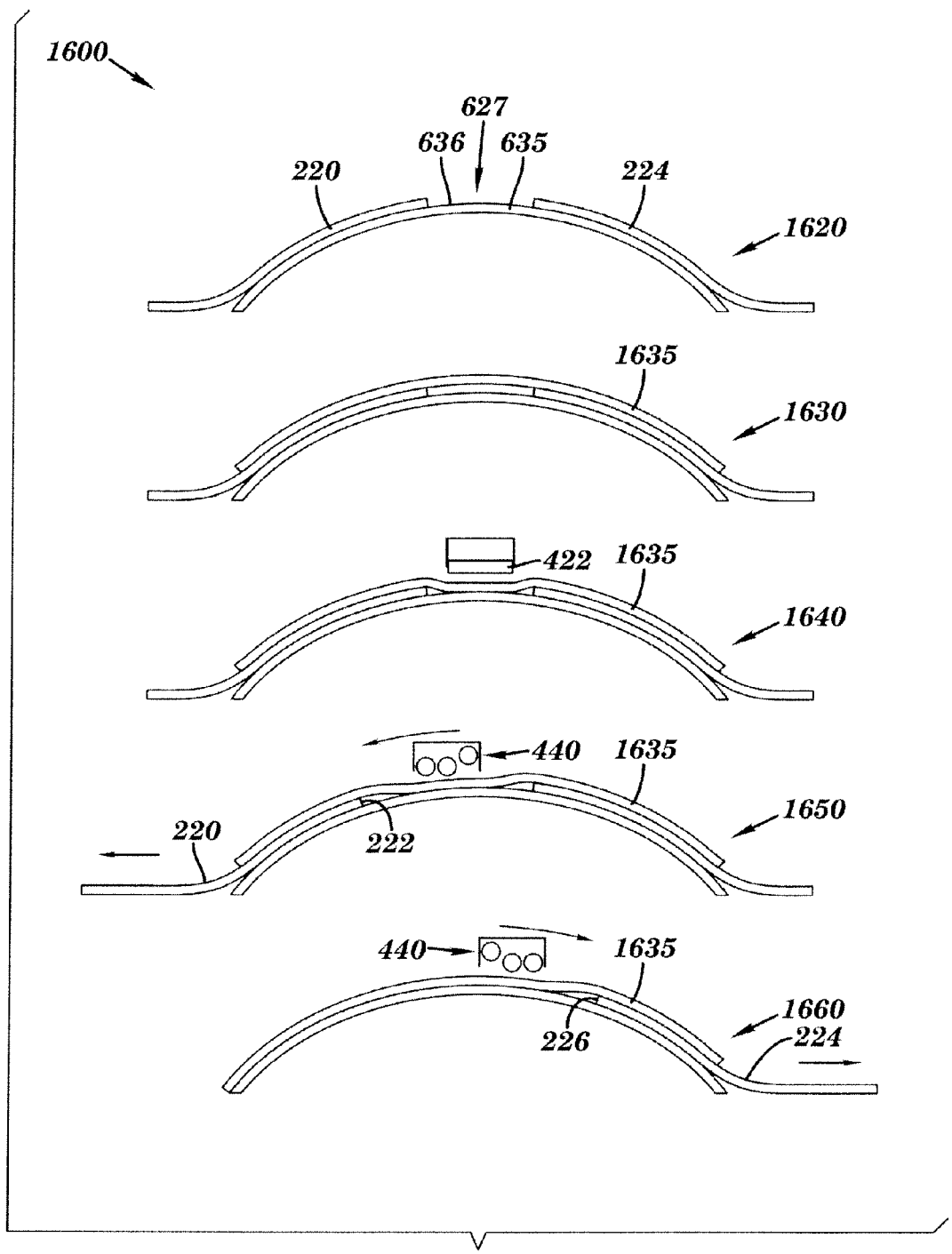
FIG. 7 is a diagrammatic illustration of a process using the layup system of FIG. 2 in accordance with aspects of the present technique for laying up one or more plies onto an uncured composite layup such as formed by the process of FIG. 6.

FIG. 7 is a diagrammatic illustration of a process 1600 in accordance with aspects of the present disclosure for use in automating one or more portions of the subsequent layup of a ply or a stack of plies onto, for example, the uncured composite layup formed in FIG. 6. The nonstick separators may be reused for the layup of subsequent plies.

At 1620, first and second nonstick separators 220 and 224 are replaced onto the curved upper surface 636 of the prior adhered uncured composite layup formed by ply 635 with a gap 627 disposed between the nonstick separators. At 1630, a ply 1635 such a ply or a stack of plies is positioned on top of the nonstick separators. At 1640, a movable compressive force is applied to drape, tack, secure, or adhere the center portion of the ply without wrinkles along the width of the uncured composite layup. For example, end effector 420 (FIG. 9) having one or more compaction rollers 422 may be employed to apply a compaction pressure from the center of ply 1635 axially, normal to the length of the tool, out to the edges of the tool. This step secures or fixes the ply relative to the adhered uncured composite layer, and inhibits the likelihood of forming wrinkles in the portion of the ply adhered along the center portion of the tool. In addition, adhering the center portion of the ply maintains the ply relative to the uncured composite layup during subsequent operations. At 1650, a movable compressive force is applied, for example, with end effector 440, to drape and adhere ply 1635 without wrinkles outward from the center of the tool in a first direction along the longitudinal length of the tool, and at the same time, nonstick separator 220 is removed longitudinally away from the center of the tool, edge 222 being a moving trailing edge, while ply 1635 is draped, tacked, secured, or adhered onto the uncured composite layup without wrinkles along a first portion of the longitudinal length of the tool. The nonstick separator inhibits the ply or stack of plies from sticking to the uncured composite layup prior to the ply being draped and tacked onto the uncured composite layup. At 1660, a movable compressive force is applied, for example, with end effector 440, to drape or adhere the ply without wrinkles outward from the center of the tool in a second direction along the length of the tool, and at the same time, nonstick separator 224 is removed longitudinally away from the center of the tool, edge 226 being a moving trailing edge, allowing the ply to be adhered without wrinkles onto the uncured composite layup along a second portion of the longitudinal length of the tool to form an uncured composite layup. The nonstick separators may be reused again for the layup of subsequent plies in a similar manner as illustrated in FIG. 7. In the process illustrated in FIGS. 6 and 7, it will be appreciated that the application of the moving compressive force may include applying the longitudinal moving compressive force first and the axial moving force second. In addition, the particular geometry of the part to be formed may dictate the number of non-stick separators, the position of the starting point of the layup, and the order and direction of the removal of the nonstick separators and the application of the moving compressive force.

From the present description, it will be appreciated that the present technique may also be applied to a tool such as a flat or curved pre-layup table for forming a plurality of plies or stacks of plies, which are subsequently used for forming the composite part. This may allow for the ply or stack of plies to be already partially or fully formed before being placed and compacted into the final cure tool. In addition, the technique of the present disclosure may include automatically controlling applying a moving compressive force to an outer surface of the at least one ply with the at least one nonstick separator disposed between the at least one ply and the tool or the uncured composite layup, which may occur prior to removing the nonstick separator. This may allow to partially or fully form the ply or stack of plies in the tool before the ply or stack undergoes final compaction and adhesion to the tool or previous composite layer. Further, the specific draping sequence may depend on the materials, the configuration of the mold, the size of the plies, and other parameters.

Figure 11:
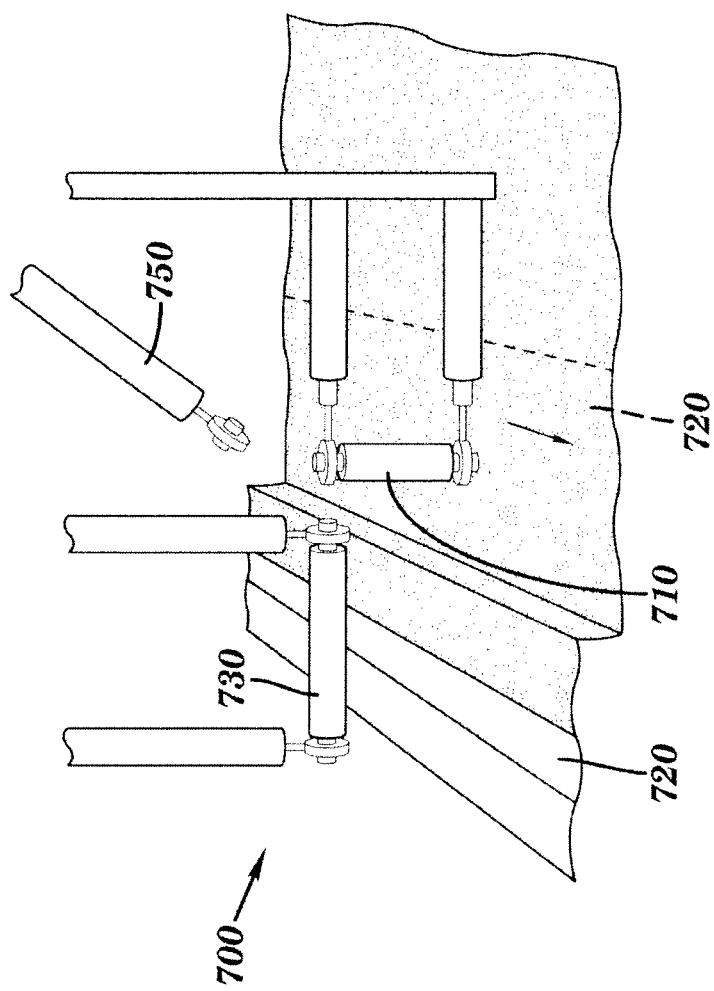
FIG. 11 is a perspective view of an end effector for use in applying a moving compressive force for adhering a ply to intersecting surfaces of a tool or to an uncured composite layup.

With reference to FIG. 11, in another embodiment, an end effector 700 may allow for forming intersecting surfaces such as sidewalls, steps, flanges, etc. along a portion of the part. End effector 700 may include a generally vertically-extending roller 710, a horizontally disposed roller 730, and an angled roller 750 for applying pressure to the edges of a ply disposed on the step or flange. A set of end effectors 700 (only one of which is shown in FIG. 11) may be employed for applying a moving compressive force from the center of the ply longitudinally outward in a first direction, e.g., in the directions of the arrow in FIG. 11, to the edge of the longitudinal end of the tool to inhibit the likelihood of forming wrinkles along and over the longitudinal edges on a first longitudinal half of the applied ply. The process can be repeated for applying pressure from the center of the ply longitudinally outward in a second direction to the other longitudinal end of the tool to inhibit the formation of wrinkles forming along and over the longitudinal edges on the second half of the applied ply. Alternatively, end effectors 440 (FIG. 10) and 700 may be operated at the same time and/or end effector 440 (FIG. 10) may be operated first and then end effector 770 operated thereafter. For laying up plies forming a curved part having a vertical wall, the center of a ply may be adhered as described above, and as a result, the side edge portions of the ply may be under tension and pulled slightly inward. Desirably, rollers 710 and/or 730 are retractable to allow the roller to initially straighten the inwardly extending ply under tension adjacent to the center of the wall and then apply the moving compressive force to adhere the ply along the length of the wall. Alternatively, the retractable rollers may be employed to initially straighten the ply with reduced compaction along the length of the wall (e.g., with the nonstick separator retained under the ply), and then a second pass with the rollers is operable to apply the moving compressive force to adhere the ply along the length of the wall (e.g., while the non-stick separator is removed).

Figure 12:
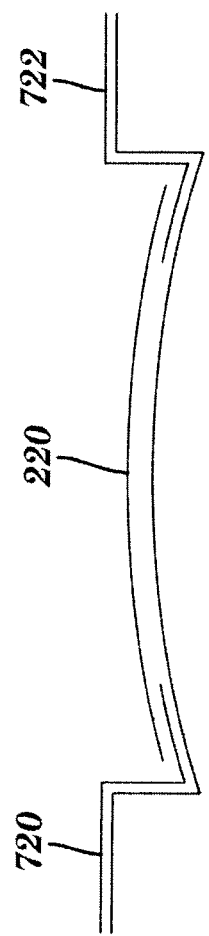
FIG. 12 is a cross-sectional view of the tool of FIG. 1 taken along the width of the tool having three nonstick separators that extend across the width of the molding surface.

For parts requiring the forming of a sidewall, step, flange, etc., a plurality of side release or nonstick separators 720 may be employed as shown in FIG. 12 and positioned and removed when end effector 700 is operated to apply a moving compaction force to the ply. The various rollers may also be retractable allowing the rollers to engage areas where a part changes directions. It will be appreciated that other tool geometries may result in a plurality of nonstick separators and rollers having different placement and/or orientations, and movements in different directions compared to those shown in the figures.

Figure 13:
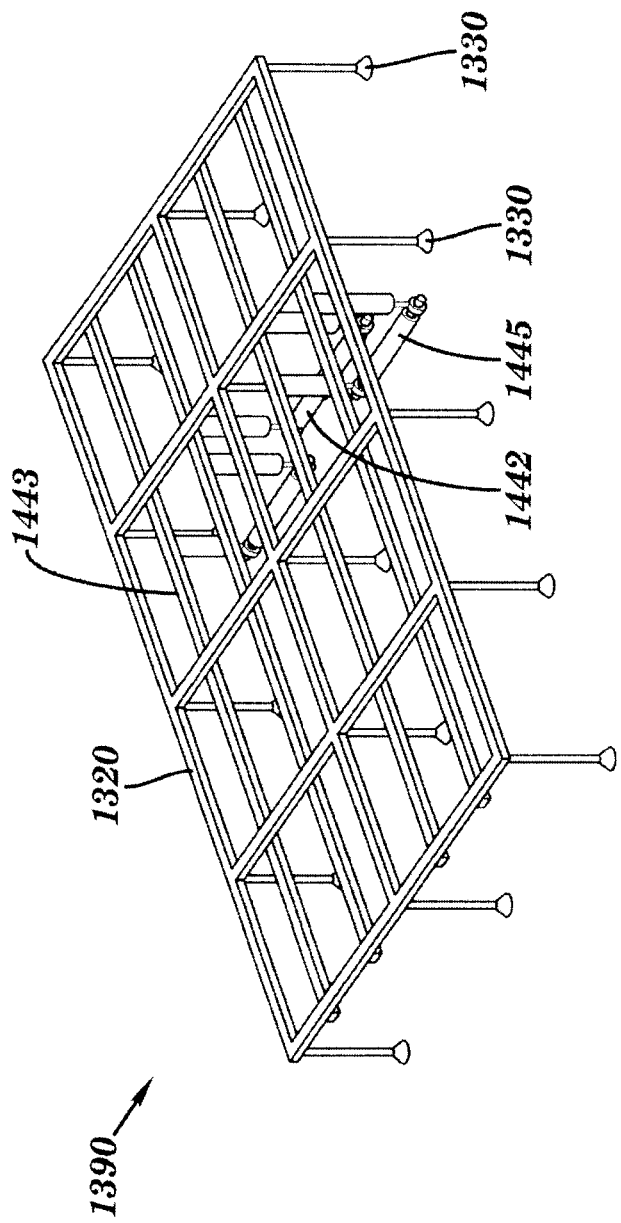
FIG. 13 is a top perspective view of an end effector for use in moving a ply such as one or more plies from a layup table onto a tool and applying a moving compressive force to an outer surface of the ply.

FIG. 13 illustrates a combination end effector 1390 which allows combining moving a ply or a stack of plies, from the pre-layup table onto the nonstick separator disposed on the molding surface of the tool or on the uncured composite layup, and applying a moving compressive force to an outer surface of the at least one ply relative to a moving trailing edge of the at least one nonstick separator or within a gap in the non-stick separators to adhere at least a portion of the at least one ply without wrinkles to the tool or uncured composite layup. For example, end effector 1390 may include a movable frame 1320 having a plurality of suction cups 1330 for releasably attaching to a ply disposed on the pre-layup table and allowing the ply to be moved upwardly off of the pre-layup table, translated over to the tool, and then lowered onto the nonstick separator or separators disposed on the tool or the uncured composite layup. The suction cups may be operably attached to a vacuum source and controlled by controller 500 (FIG. 2). In addition, end effector 1390 may include a plurality of rollers 1442, 1443, 1445 for applying pressure to adhere, drape, tack, or compact the ply to the tool or to an uncured composite layup, as described above.

Figure 14:
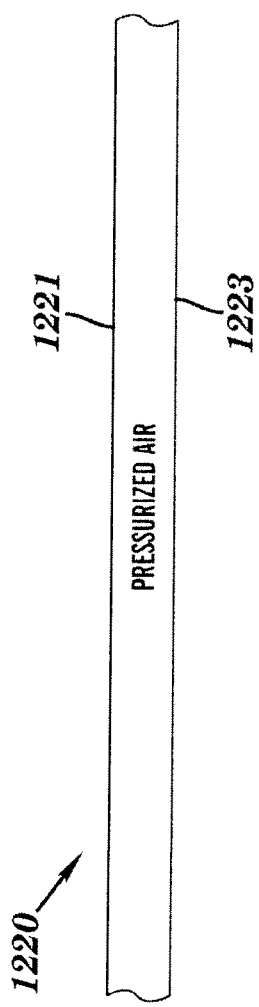
FIG. 14 is a cross-sectional view of a nonstick separator in the form of an air cushion.

With reference to FIG. 14, the nonstick separator may be a nonstick separator 1220 in the form of an air cushion. For example, nonstick separator 1220 may include a pair of separators 1221 and 1223 which are sealed on their edges. A plurality of holes may be disposed on the upper separator from which pressurized air may be emitted, or the upper separator may be a fabric material through which the pressurized air may pass. The emitted air may form an air layer to allow the ply to readily move prior to being adhered to the tool or uncured composite layup as described above.

In another embodiment, a nonstick separator may be operably vibrated to aid in allowing the ply to readily move prior to being adhered to the tool or uncured composite layup as described above. In another embodiment, a nonstick separator may be cooled to prevent the resins or other adhesive components within the ply or stack of plies from sticking to the non-stick separator. This cooling may be done by passing cooled air or liquid through hollow passages within the non-stick separator or by other means.

Figure 15:
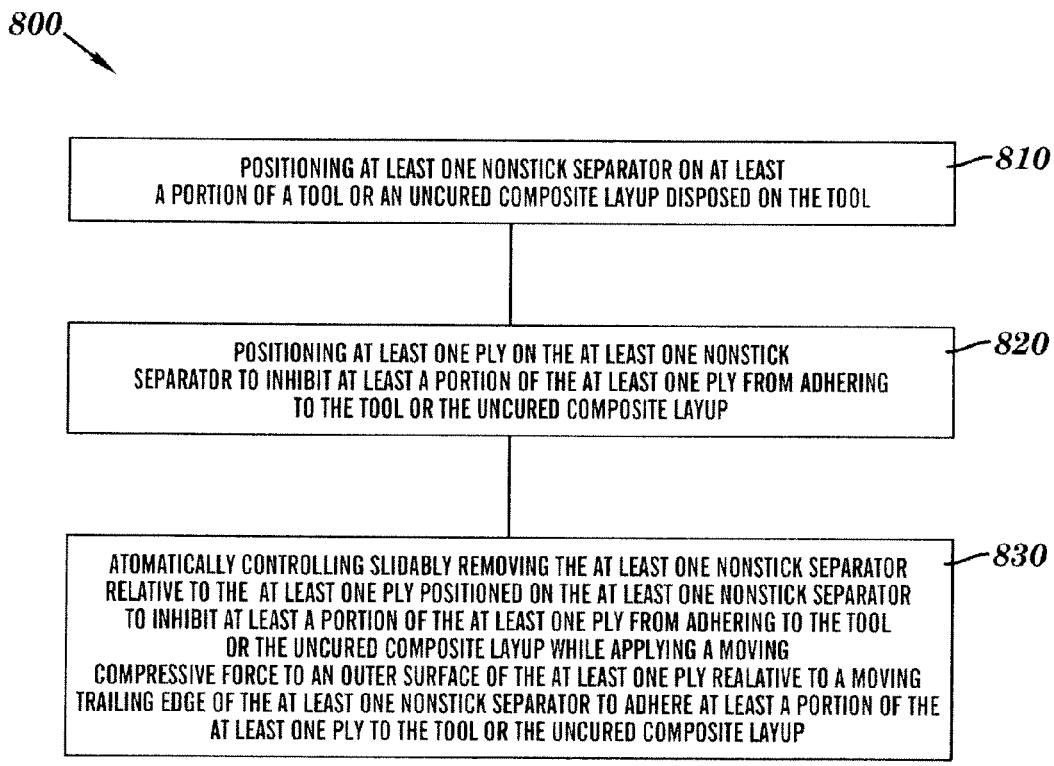
FIG. 15 is a flowchart of one embodiment of a method for automatically laying up a plurality of plies onto a tool or onto an uncured composite layup disposed on the tool in accordance with aspects of the present disclosure for use in forming a composite part.

FIG. 15 illustrates one embodiment of a method for use in automating one or more portions of the layup of a plurality of plies onto a tool in accordance with aspects of the present disclosure for use in forming a composite part. At 810, at least one nonstick sheet is manually or automatically positioned on at least a portion of the tool or onto the uncured composite layup disposed on the tool, and at 820, at least one ply is manually or automatically positioned on the at least one nonstick separator to inhibit at least a portion of the at least one ply from adhering to the tool or the uncured composite layup to prevent the forming of wrinkles. At 830, slidably removing the at least one nonstick separator relative to the at least one ply positioned on the at least one nonstick separator is automatically controlled to inhibit at least a portion of the at least one ply from adhering to the uncured composite layup and to prevent the formation of wrinkles, while applying a moving compressive force to an outer surface of the at least one ply relative to a moving trailing edge of the at least one nonstick separator to adhere at least a portion of the at least one ply without wrinkles to the tool or to the uncured composite layup.

The various end effectors may be connected to the end of a robot arm or other movable device. For example, the roller end effectors can be attached to a robot arm for a range of movements. The assembly of multiple rollers allows draping a ply onto a tool with a complex profile. The rollers may be pneumatically or spring actuated, which allows for variation in compaction pressure, the build-up of thickness, and may be actuated in a predefined sequence and for retraction to avoid collisions with the tool. The rollers may have a constant cylindrical surface or a tapered surface. Other devices for applying a moving compressive force may be employed, such as a device having rounded edge or an angled surface for compressing the ply. The surfaces of a roller may be compliant and allow for applying a moving compressive force to the ply on a changing complex surface and avoid sliding of one portion of the roller relative to another portion. The nonstick separators may be rigid, semi-rigid, or flexible. To prevent adhesion with the prepreg, the nonstick separators may be formed form or coated with a non-stick material such as TEFLON, and/or cooled and/or vibrated. The present technique may be used to drape prepreg material having different fiber orientations. The plies may have the same or different shapes and sizes such as different lengths and the same of different widths. In addition, the system may include a heater for applying heat to the prepreg material as it is being draped to aid in tack and compaction.

While the nonstick separator and ply are illustrated in the drawings as resting on the molding surface of the tool or on the upper surface of the uncured composite layup prior to applying the moving rollers, it will be appreciated that the nonstick separators and plies may be held in a spaced apart relationship relative to the molding surface of the tool or the upper surface of the uncured composite and only a portion of the ply acted on by the moving compression roller made to contact the molding surface of the tool or the upper surface of the uncured composite layup during the process of adhering the ply.

Additional aspects of the methods and systems of the present disclosure include a roller based end-effector mounted to a robot to drape material onto flat surfaces, as well as onto complex geometric surfaces; rollers having different shapes, hardness, and arrangement; different means to actuate the rollers such as pneumatic, spring-based system, and motor driven; non-stick support separators for draping applications or other support mechanism such as air cushion, or flexible or rigid separator, that prevents material from adhering to the tool or previously draped material; an automated solution for retracting the support separator, which is used in conjunction with a draping application; different materials for a draping application such as carbon or glass fiber epoxy prepreg, other thermoset or thermoplastic prepreg, adhesive sheets, and other materials; fixed ply size or plies of different sizes and shapes to be draped; different motion paths for draping, for example axial, longitudinal, diagonal, or other paths for draping; and adhering plies to curved or complex surfaces, as well as flat surfaces.

In light of the above description, it will be appreciated by those skilled in the art that certain aspects provide an automated solution having the ability to drape into a complex 3D geometry, and capable of draping prepreg material and adhesive sheets of various sizes, shapes and orientations. Aspects of the present disclosure also provide the labor savings, increased productivity and quality through automation, cost savings due to shorter cycle time and serialization by scale up, and more repeatable and reliable part formation. In addition, the operation of the end effectors, the motion path of the end effectors, along with the use of nonstick separators, reduces if not eliminates the likelihood of forming wrinkles as the end effectors drape the material into the tool.

With reference to manual layup, cost can be high due to higher labor requirements. Automated tape and fiber placement have performance knockdowns because of course/tow gaps and overlaps and the sawtooth edges from the straight tow cuts required in fiber placement. For the reasons explained above, the aspects of the present disclosure allowing the ability to automatically layup complete ply shapes cut from broadgood material may provide cost savings relative to manual layup and performance benefits relative to automated fiber or tape placement.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for applying at least one ply onto a tool or onto an uncured composite layup disposed on the tool, the method comprising:
    automatically controlling slidably removing at least one nonstick separator relative to the at least one ply positioned on the at least one nonstick separator to inhibit at least a portion of the at least one ply from adhering to the tool or to the uncured composite layup while applying a moving compressive force to an outer surface of the at least one ply relative to a moving trailing edge of the at least one nonstick separator to adhere at least a portion of the at least one ply to the tool or to the uncured composite layup.

2. The method of claim 1, further comprising at least one of:
    positioning the at least one nonstick separator on at least a portion of the tool or the uncured composite layup disposed on the tool; and
    positioning the at least one ply on the at least one nonstick separator to inhibit at least a portion of the at least one ply from adhering to the tool or to the uncured composite layup.

3. The method of claim 1, further comprising:
    positioning the at least one nonstick separator on at least a portion of the tool or the uncured composite layup disposed on the tool, and positioning the at least one ply on the at least one nonstick separator to inhibit at least a portion of the at least one ply from adhering to the tool or to the uncured composite layup.

4. The method of claim 1, further comprising at least one of:
    automatically positioning the at least one nonstick separator on at least a portion of the tool or the uncured composite layup disposed on the tool; and
    automatically positioning the at least one ply on the at least one nonstick separator to inhibit at least a portion of the at least one ply from adhering to the tool or to the uncured composite layup.

5. The method of claim 1, further comprising:
    automatically positioning the at least one nonstick separator on at least a portion of the tool or the uncured composite layup disposed on the tool, and automatically positioning the at least one ply on the at least one nonstick separator to inhibit at least a portion of the at least one ply from adhering to the tool or to the uncured composite layup.

6. The method of claim 1, wherein the automatically controlling comprises:
    automatically controlling slidably removing at least one nonstick separator at the same rate as applying the moving compressive force to an outer surface of the at least one ply.

7. The method of claim 1, further comprising:
    automatically positioning a plurality of nonstick separators on at least a portion of the tool or the uncured composite layup disposed on the tool.

8. The method of claim 1, wherein the automatically controlling comprises:
    automatically controlling slidably removing a first one of the at least one nonstick separator in a first direction relative to the positioned at least one ply while applying the moving compressive force to the outer surface of the at least one ply adjacent to the moving trailing edge of the first one of the at least one nonstick separator to adhere at least a first portion of the at least one ply to the tool or to the uncured composite layup; and
    automatically controlling slidably removing a second one of the at least one nonstick separator in a second direction relative to the positioned at least one ply while applying the moving compressive force to the outer surface of the at least one ply adjacent to the moving trailing edge of the second one of the at least one nonstick separator to adhere at least a second portion of the at least one ply to the tool or to the uncured composite layup.

9. The method of claim 1, further comprising:
    automatically positioning a plurality of nonstick separators on at least a portion of the tool or the uncured composite layup disposed on the tool with edges of the plurality of nonstick separators defining at least one gap therebetween.

10. The method of claim 1, wherein the automatically controlling comprises:
automatically controlling applying a moving compressive force to an outer surface of the at least one ply over a gap disposed between the at least one nonstick separator comprising a plurality of nonstick separators to adhere at least a portion of the at least one ply to the uncured composite layup.

11. The method of claim 1, wherein the tool comprises a non-flat planar molding surface, and the automatically controlling comprises:
automatically controlling slidably removing the at least one nonstick separator relative to the positioned at least one ply while applying the moving compressive force to the outer surface of the at least one ply adjacent to the moving trailing edge of the at least one nonstick separator to adhere at least a portion of the at least one ply to the non-flat planar molding surface of the tool or to the uncured composite layup disposed on the non-flat planar molding surface.

12. The method of claim 1, wherein the tool comprises intersecting surfaces, and the automatically controlling comprises:
automatically controlling slidably removing the at least one nonstick separator relative to the positioned at least one ply while applying a moving compressive force to the outer surface of the at least one ply adjacent to the moving trailing edge of the at least one nonstick separator to adhere at least a portion of the at least one ply to the intersecting surfaces of the tool or to the uncured composite layup disposed on the intersecting surfaces.

13. The method of claim 1, further comprising:
automatically controlling applying a moving compressive force to an outer surface of the at least one ply with the at least one nonstick separator disposed between the at least one ply and the tool or the uncured composite layup.

14. The method of claim 1, further comprising:
applying heat to the ply.

15. The method of claim 1, wherein the at least one nonstick separator comprises a nonstick sheet.

16. The method of claim 1, wherein the at least one nonstick separator comprises at least one of an air cushion having a plurality of apertures through which air is emitted, a vibrating sheet, and separator having passages for receiving a cooled fluid therein.

17. The method of claim 1, further comprising at least one roller for applying the moving compressive force to the outer surface of the at least one ply.

18. The method of claim 1, wherein the at least one roller comprises at least one conical roller.

19. The method of claim 1, wherein the at least one ply comprises at least one of a composite, adhesive, foam, wood, honeycomb, bagging material, peel ply, release film, bleeder, breather, and bagging film.

20. The method of claim 1, wherein the at least one ply comprises a stack of plies.

* * * * *